United States Patent [19]
Myodo et al.

[11] Patent Number: 5,359,503
[45] Date of Patent: Oct. 25, 1994

[54] SURFACE LUMINOUS LIGHTING UNIT

[75] Inventors: Osamu Myodo; Harumi Sawada; Masao Karino; Takeo Saikatsu; Takehiko Sakurai; Sadayuki Matsumoto; Kenji Suzuki, all of Kanagawa, Japan

[73] Assignee: Mitsubishi Denki Kabushiki Kaisha, Tokyo, Japan

[21] Appl. No.: 901,845

[22] Filed: Jun. 22, 1992

[30] Foreign Application Priority Data

Jun. 24, 1991 [JP] Japan ................. 3-152004
Feb. 12, 1992 [JP] Japan ................. 4-025116

[51] Int. Cl.$^5$ ................................ F21V 8/00
[52] U.S. Cl. ........................ 362/127; 362/31; 362/260; 362/33
[58] Field of Search ............. 362/31, 26, 32, 33, 362/97, 125, 127, 260, 269

[56] References Cited

U.S. PATENT DOCUMENTS

| | | | |
|---|---|---|---|
| 2,480,178 | 8/1949 | Zinberg | 362/31 |
| 4,642,736 | 2/1987 | Masuzawa et al. | |
| 4,985,809 | 1/1991 | Matsui et al. | 362/31 |
| 5,035,392 | 7/1991 | Gross et al. | 248/918 |
| 5,046,826 | 9/1991 | Iwamoto et al. | |
| 5,122,941 | 6/1992 | Gross et al. | 248/918 |

FOREIGN PATENT DOCUMENTS

| | | |
|---|---|---|
| 0167721 | 1/1986 | European Pat. Off. . |
| 9000867 | 3/1991 | Fed. Rep. of Germany . |
| 61-105504 | 5/1986 | Japan . |
| 63-69102 | 3/1988 | Japan . |
| 2-26323 | 6/1990 | Japan . |
| 1379276 | 1/1975 | United Kingdom . |

Primary Examiner—James C. Yeung
Assistant Examiner—L. Heyman
Attorney, Agent, or Firm—Burns, Doane, Swecker & Mathis

[57] ABSTRACT

A surface luminous lighting unit has a light panel comprising a plurality of light guiding plates laminated in different lengths. The longer side of the light panel is made shorter than the distance between filaments of a lamp, and longer than the distance between the portions where a luminance of the lamp is equal to 75% of the maximum luminance of the lamp. The surface luminous lighting unit comprises a light guide which comprises a plurality of light guiding plates in different length laminated in such a manner that the sides of those plates where light enters are made level with each other, where the other sides thereof are arranged in a step-like. A linear light source is affixed to the light entering side of the light guide, and a reflector is affixed to the light exiting side of the light guide in such a manner as to extend thereover.

6 Claims, 14 Drawing Sheets

SURFACE LUMINOUS LIGHTING UNIT

BACKGROUND OF THE INVENTION

1. Field of the Invention

The present invention relates to a surface luminous lighting unit that is formed into a compact unit, and which is free of glares so as to effectively illuminate things to be illuminated.

2. Description of the Prior Art

The lamp structure of a conventional lighting unit will be described.

FIG. 6 shows the structure of a conventional lighting unit, such as disclosed in the official gazette of Japanese Patent Laid-Open No. 63-69102 (not examined), in which reference numeral 1 denotes a lamp, reference numeral 2 a light-transmitting light panel, reference numeral 3 a base of the lamp 1, and reference numeral 8 a lamp luminous portion that is the portion of the lamp 1 excluding the base 3 thereof. Reference X total length of lamp 1.

This lighting unit is intended to obtain illumination of an edge-light type by providing the light-transmitting light panel 2 and the lamp in parallel to each other. If the length of the lamp luminous portion 8 excluding the base 3 is represented as L1mp, the length of the longer side of the light panel 2 as Lpn1, the distance between the lamp 1 and the light panel 2 as A, and the angle of incidence as $\theta$ at which light enters the end portion of the light panel 2 from the end portion of the lamp luminous portion 8, the length of the lamp luminous portion 8 is expressed as $$L1pm = 2 \times A \times \tan\theta + Lpn1,$$

where $\theta$ is in the range of 34° to 50°.

It is possible to make uniform the luminance on the surface of the light panel by determining the length L1mp of the lamp luminous portion 8 and the length Lpn1 of the longer side of the light panel 2 in such a manner that the above equation is fulfilled.

Since the conventional lighting unit is constructed as described above, the range of the length Lpn1 of the longer side of the light panel is determined by the distance A between the lamp 1 and the light panel 2 and the length L1mp of the lamp luminous portion 8. For instance, if we now set A=3 mm, and L1mp=390 mm, the optimal length of the longer side of the light panel 2 falls within the range of 383 to 386 mm.

A graph shown in FIG. 7 shows the results of measuring the illuminance on the illuminated surface while altering the horizontal distance from the lighting unit wherein a lamp of total length×420 mm long (L1mp=390 mm) was provided at a position 3 mm away from the light panel (A=3 mm), the length of the longer side of the light panel 2 was changed so as to be 280, 310, 340, 370, and 400 mm, and the lighting unit was mounted at 300 mm high above the illuminated surface with the luminous surface of the light panel 2 being faced downwardly. It is understood from this graph that there is little difference in illuminance distribution until the length Lpn1 of the longer side of the light panel was reduced to 310 mm, while there was a difference when it was reduced to 280 mm. Therefore, when used as a part of a lighting unit, even if the length Lpn1 of the longer side of the light panel is set to be 310 mm, it is possible to obtain substantially the same degree of illuminance as would be obtained with the greater Lpn1s. Consequently, the rule expressed by the above equation is not appropriate.

FIG. 8 is a graph showing a relationship between the luminance and position of a fluorescent lamp 1, having a length of 420 mm and a diameter D off 16.7 mm, with filaments being disposed E=40 mm inwardly from the ends of the lamp, respectively. The luminance of the lamp 1 decreases towards the ends of the lamp, and falls drastically in the areas where the filaments 4 and bases 3 are provided. The difference in luminance causes an unevenness in the brightness of the light panel 2. Due to this, the length Lpn1 of the longer side of the light panel 2 should be set to be substantially the same as the distance F=340 mm between the filaments 4,4 of the lamp. Since the length Lpn1 of the light panel 2 is subject to substantially the same degree of illuminance with in the range from 310 to 400 mm, the length Lpn1 can be determined at 310 mm. Therefore, the rule stipulated by the above equation is not proper.

Thus, according to the above equation, there is a drawback in that the longer side of the light panel is made too long for use as a part of a lighting unit, eventually causing the light panel to become extremely heavy. Thus it is not appropriate to use the above equation to apply.

With the conventional lighting unit, there is also another drawback in that since it is not formed as a unit, a fixing means has to be provided for each place to be illuminated. Thus it is troublesome and consuming, because it takes much time to fix them. Additionally, it causes deteriorative operating efficiency.

DISCLOSURE OF THE INVENTION

The present invention was made to solve the problems stated above, and one object thereof is to provide a lighting unit in which the length of the longer side of time light panel is minimized relative to the length of the effective portion to thereby reduce the weight of the light panel. Another object of the present invention is to provide a lighting unit in which light from the lamp is efficiently transmitted to the light panel.

Another object of the present invention is to provide a narrow and compact lighting unit by disposing lamp operating devices in spaces formed at the ends of the light panel by minimizing the length of the longer side of the light panel relative to the length of the effective portion.

A further object of the present invention is to provide a surface luminous lighting unit that is formed as a unit and is detachably provided.

A still further object of the present invention is to provide a study desk on which the surface luminous lighting unit is affixed.

A further object of the present invention is to provide a partition in which is installed the surface luminous lighting unit.

A further object of the present invention is to provide a kitchen sink illuminated by the surface luminous lighting unit mounted above the keyboard.

Another object of the present invention is to provide the surface luminous lighting unit as a kitchen lighting Another object of the present invention is to provide a display shelf on which the surface luminous lighting unit is affixed.

Another object of the present invention is to provide a display shelf the illumination of which is effected with irradiated light, thereby making it possible to project light uniformly in a desired direction with a bat-wing light distribution in which light is well directed, but which also provides close-up illumination, as well as illumination with which an aesthetic effect can be improved.

A further object of the present invention is to provide a display shelf which utilizes a display space by having the narrow surface luminous lighting unit embedded in the main body of a display shelf in such a manner that the lighting unit is totally concealed therein.

A still further object of the present invention is to provide a keyboard on which the surface luminous lighting unit is affixed.

A further object of the present invention is to provide a surface luminous lighting unit which protect the display screen sufficiently by means of a rotatably supported keyboard.

Embodiment 1

Examples of the present invention will be described below.

Figure 1:
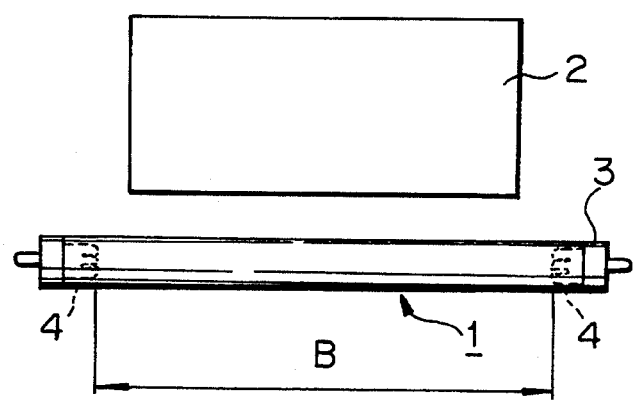
FIG. 1 is a plane view showing the construction of an embodiment of a first lighting unit of the present invention.
Figure 2:
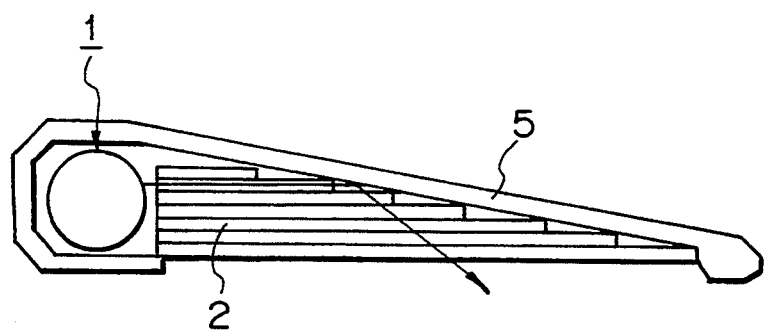
FIG. 2 is a cross-sectional view showing the construction of the embodiment of the first lighting unit.
Figure 3:
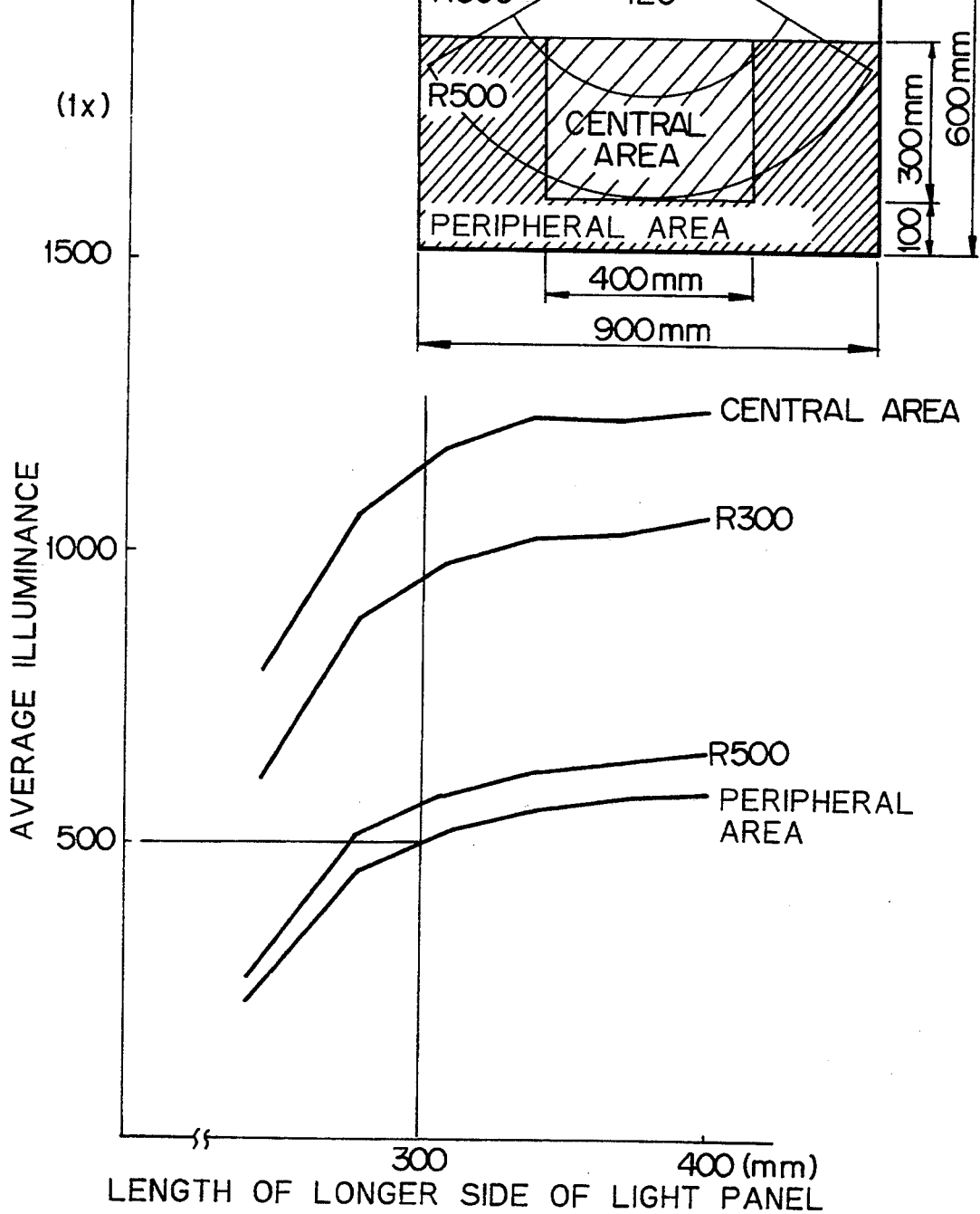
FIG. 3 is a graph showing the results of measuring of average illuminance on each area of the top of a desk carried out for each length of the longer side of a light panel when the lighting unit shown in FIGS. 1 and 2 is used as a desktop lamp and is set at a position 30 cm above the desk top.

FIG. 1 is a side view showing the construction of an example of a first lighting unit, and FIG. 2 is a cross-sectional view of the same lighting unit, in which reference numeral 1 denotes a lamp, reference numeral 2 a light panel constituted by a plurality of light guiding plates that are laminated on each other, reference numeral 8 a base of the lamp 1, reference numeral 4 a filament of the lamp 1, and reference numeral 5 a reflector for reflecting light transmitted through the light panel 2. The length of the longer side of the light panel 2 is made shorter than a distance B between the filaments 4, 4 of the lamp 1 and made longer than the distance between the portions where a luminance equal to 75% of the maximum luminance of the lamp 1 is obtained. FIG. 3 is a graph showing the results measuring of average illuminances of the respective areas on the top of a desk executed for each length of the longer side of the light panel when the lighting unit of this example is used as a desk-top lighting unit and is set at a position 30 cm above the desk top.

Next, the operation of the lighting unit will be described. The light panel 2 is constituted by a plurality of light guiding plates that are laminated on each other, and transmits light from the lamp 1. Light transmitted through the light panel 2 is then reflected by the reflector 5 so as to be irradiated in a direction shown by an arrow. Although the areas between the leading ends of the filaments 4 and the bases 3 of the lamp 1 become luminous when the lighting unit is turned on, as shown in FIG. 4, the luminance at those areas is extremely low, and light transmitted through the light panel 2 becomes brighter at the central portion of the longer side than at the ends thereof, causing unevenness of brightness in appearance.

Figure 8:
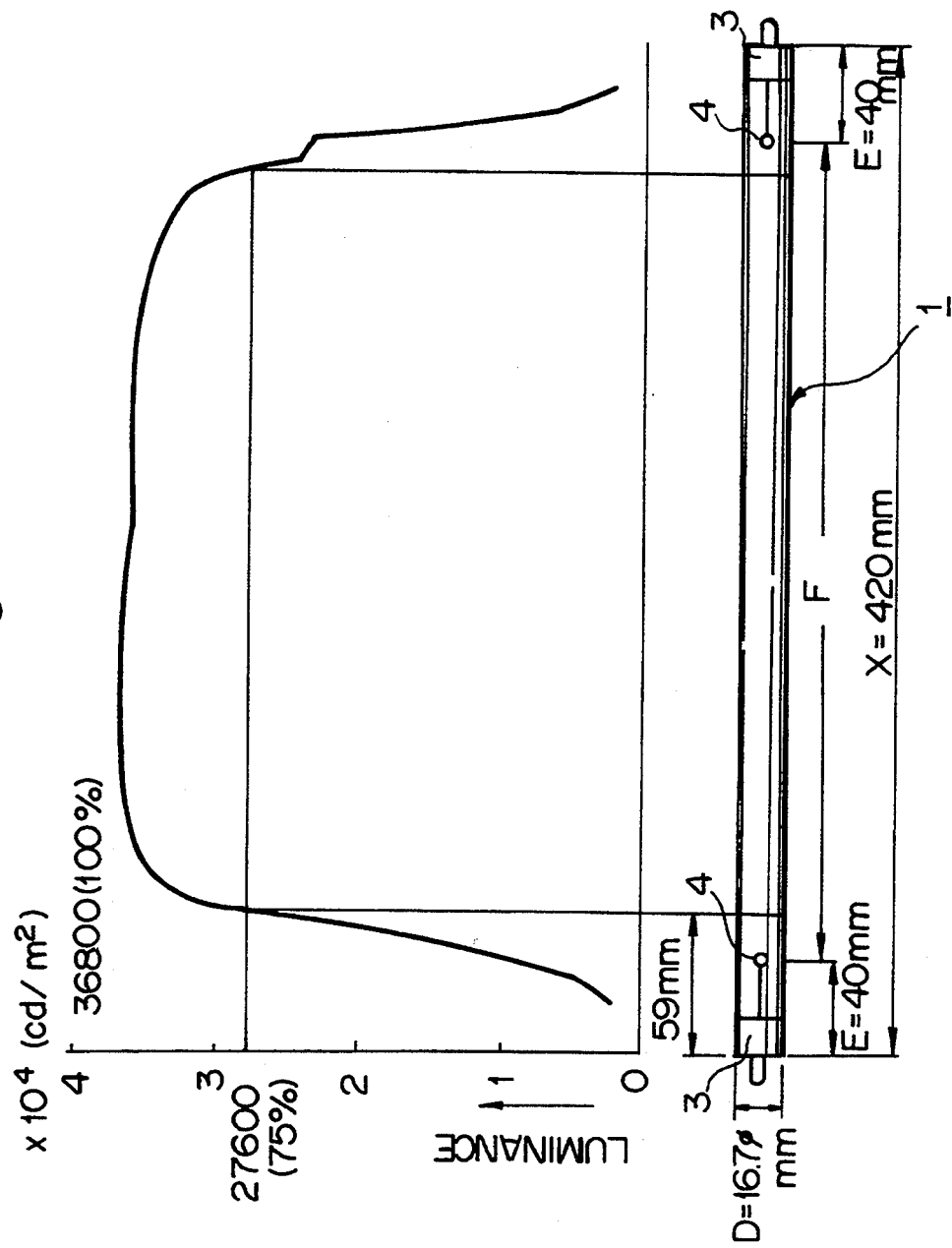
FIG. 8 is a graph showing the relationship between the luminance distribution on a fluorescent lamp that is 420 mm long and has a diameter of 16.7 mm.

It is seen from a graph shown in FIG. 3 that the average illuminances of the respective areas drastically fall when the length of the longer side of the light panel 2 becomes less than 300 mm, and it is also seen from FIG. 8 that the positions indicating that the length of the longer side of the light panel 2 is 300 mm are in conformity with the area the luminance of which is 75% or more of the maximum luminance of the lamp 1.

As stated above, however, this example is constructed so that the length of the longer side of the light panel 2 is made shorter than the distance B between the filaments 4, 4 of the lamp 1, and made longer than the distance between the portions effecting a luminance equal to 75% of the maximum luminance of the lamp 1, it is possible to not only effectively transmit light from the lamp 1 into the light panel 2 but also to reduce the weight of the light panel 2.

Figure 4:
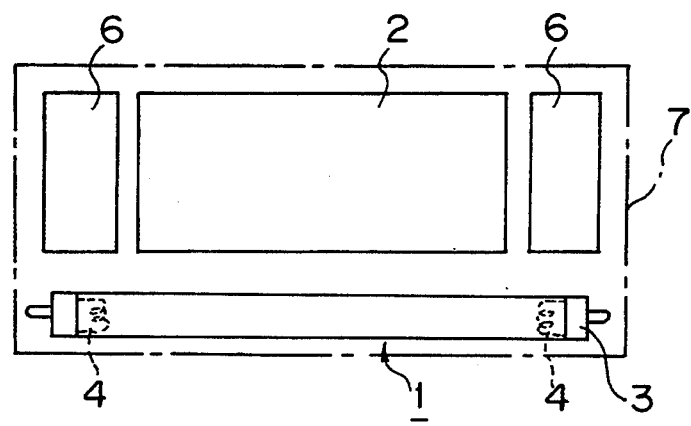
FIG. 4 is a plane view of an embodiment of a second lighting unit of the present invention.
Figure 5:
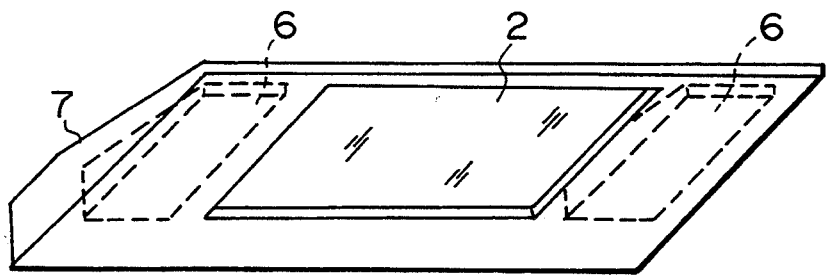
FIG. 5 is a perspective view of the embodiment of the second lighting unit.

FIG. 4 is a plane view showing the construction of an example of a second lighting unit, and FIG. 5 is a perspective view of the same.

As shown in FIGS. 4 and 5, the lighting unit according to this example has lamp operating devices 6 provided in spaces formed at the ends of the light panel 2. These spaces are formed in a housing 7 of the lighting unit by making the length of the longer side of the light panel 2 shorter than the distance between the filaments 4, 4 of the lamp 1 and longer than the portions effecting a luminance equal to 75% of the maximum luminance of the lamp 1. Specifically speaking, with reference to FIG. 4, those are spaces secured between the ends of the light panel. 2 and the ends of the lamp 1 in the housing 7.

Figure 6:
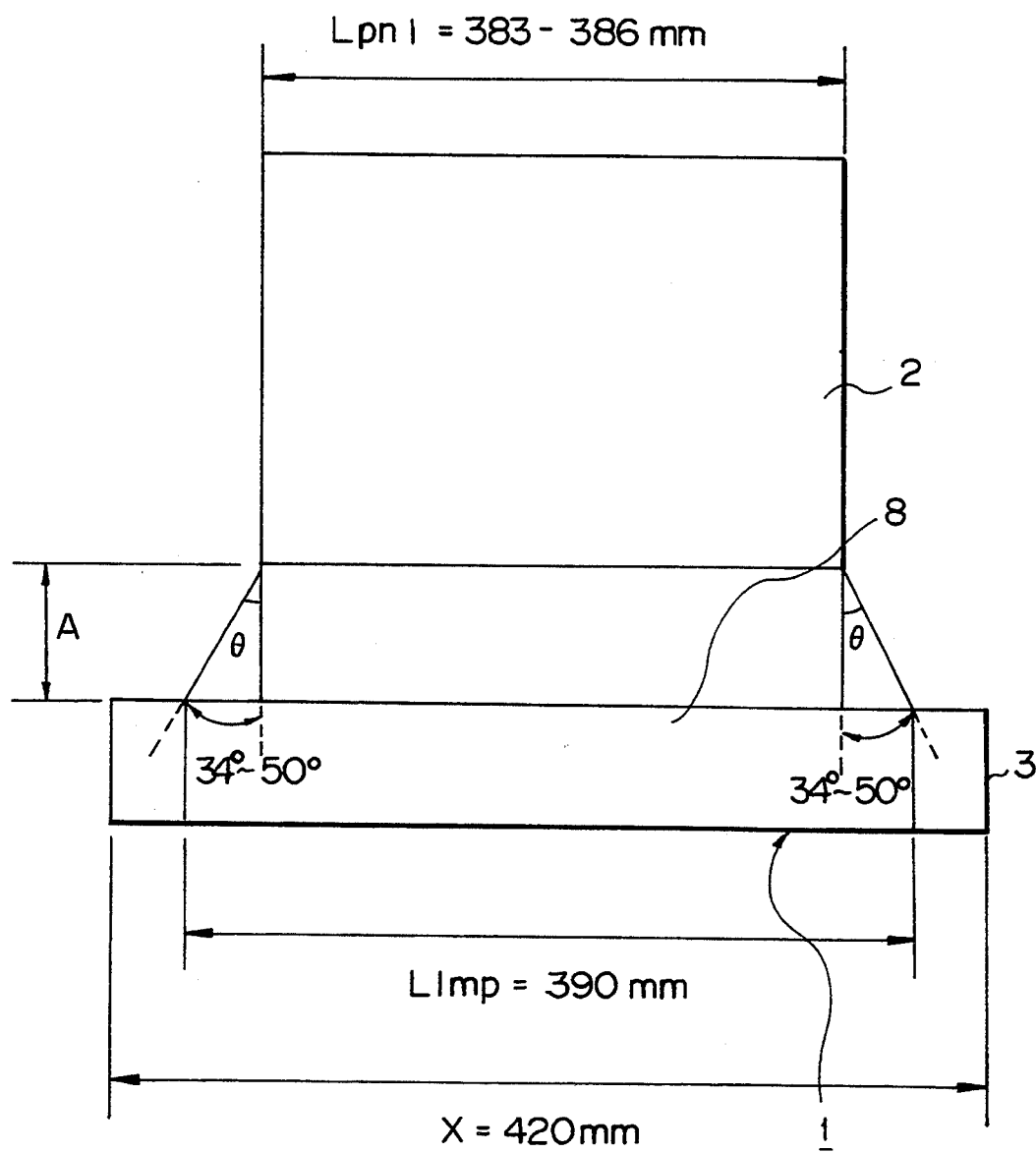
FIG. 6 shows the construction of a conventional lighting unit.
Figure 7:
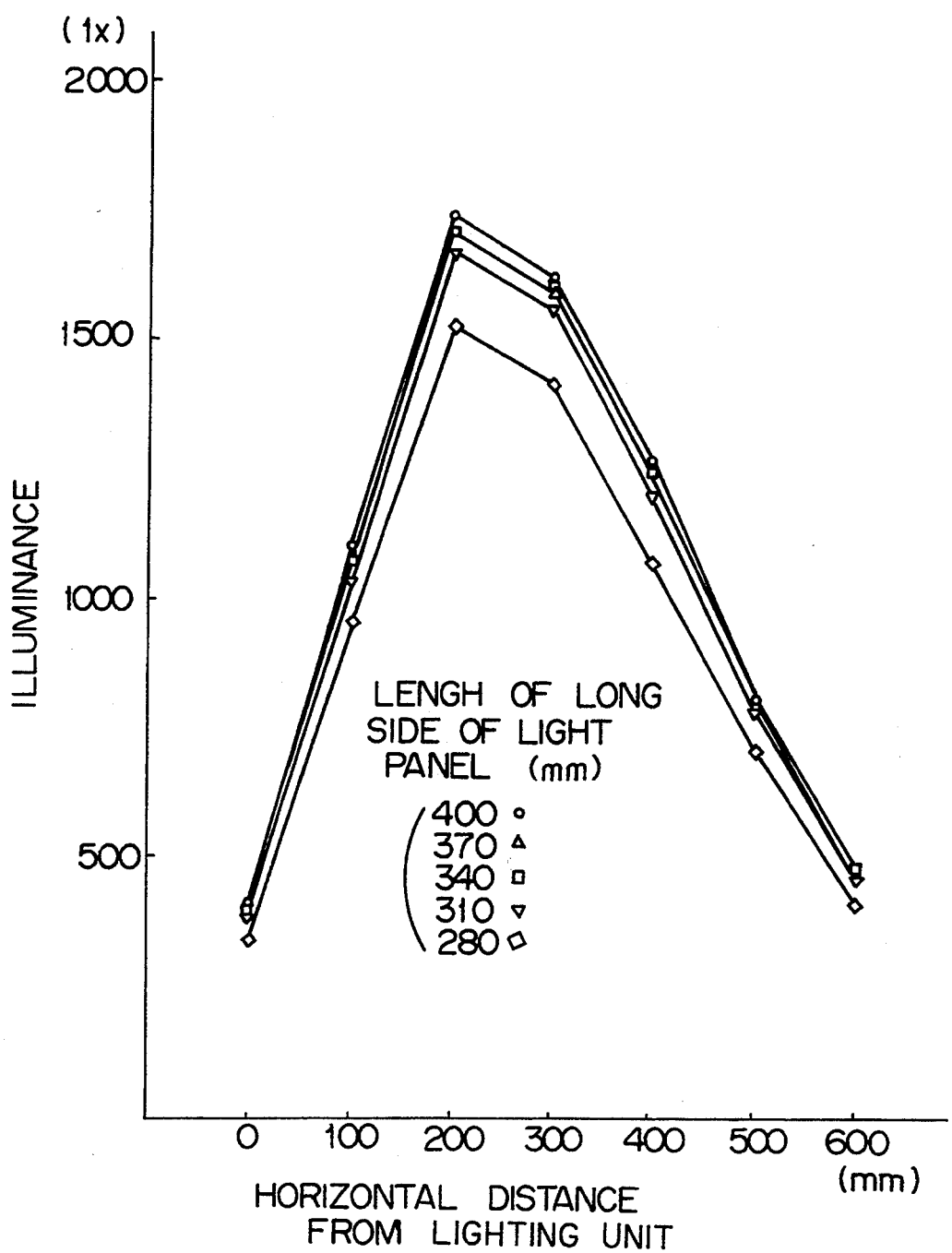
FIG. 7 is a graph of illuminance distributions on the horizontal distance from the lighting unit with reference to the length of the longer side of the light panel.

In a conventional lighting unit shown in FIG. 6, since there is not spaces like those mentioned above, in a case where lamp operating devices are provided thereon, the size of the lighting unit is made larger by a volume equal to that of the lamp operating devices provided. However, with this example, since the spaces formed as above can effectively be used, even if lamp operating devices are incorporated in the lighting unit, the size of the entire lighting unit is made smaller, and the lighting unit of the present invention can be made much narrower and more compact than conventional ones.

Furthermore, according to the first lighting unit of the present invention, since the length of the longer side of the light panel 2 is made shorter than the distance B between the filaments 4, 4 of the lamp 1, and made longer than the distance between the portions giving a luminance of 75% of the maximum luminance of the lamp 1, it is possible to reduce the weight of the light panel 2 and to effectively transmit light from the lamp 1 into the light panel 3.

Moreover, according to the second lighting unit of the present invention, since lamp operating devices are provided in the spaces formed at the ends of the above light panel 2, it is possible to make the lighting unit narrow and compact.

In addition, in this example, as shown in FIG. 5, the lighting unit is formed as a unit so that it can detachably be mounted on a thing to be illuminated. This allows the wide application of the lighting unit for illumination of devices to be illuminated such as study desks, a partition, a kitchen sink cabinet, display shelves, and a keyboard. Several examples of the present invention will be described in detail below.

Embodiment 2

Figure 9:
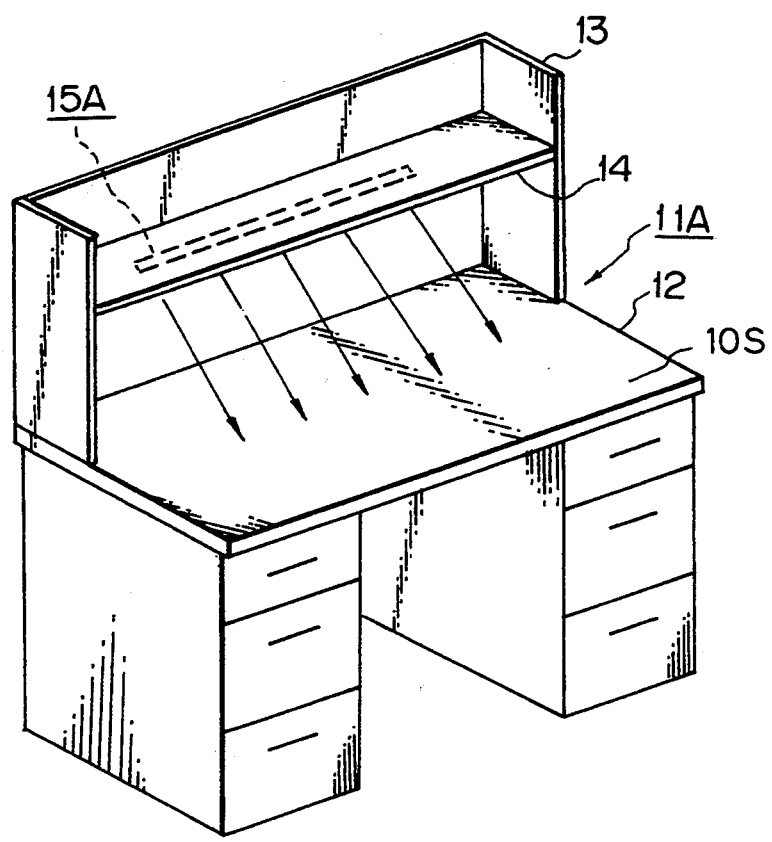
FIG. 9 is a perspective view showing the construction of a study desk, as Embodiment 2 of the present invention, in which the surface luminous illumination of the invention provided thereon.
Figure 10:
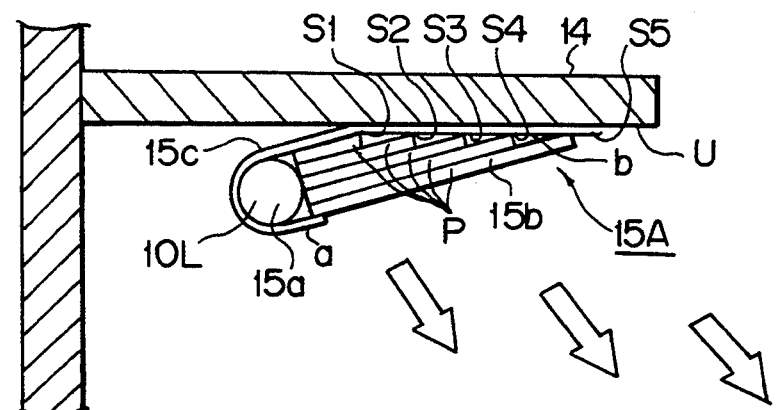
FIG. 10 shows the construction of the main part of Embodiment 2.

FIG. 9 is a perspective view showing one embodiment of a study desk equipped with the surface luminous illumination, and FIG. 10 is a side cross-sectional view showing the construction of the main part of the above example.

In FIGS. 9 and 10, reference numeral 11A denotes a study desk equipped with the surface luminous illumination, reference numeral 15a a high-luminance narrow tube fluorescent lamp (hereinafter, referred to as a lamp), as one example of a linear light source L, the diameter which is made far smaller than that of a conventional fluorescent lamp, for instance, half the diameter of the latter, reference numeral 15b a light guide (hereinafter, referred to as a light guide) in which five light guiding plates P are laminated on each other so as t correspond to the diameter of the fluorescent lamp 15a in such a manner that they are made level with each other on the sides where light enters, while being arranged in a step-like fashion on the sides where light exits, those guiding plates being formed from a material providing good transmission of light such as a methyl methacrylate polymer and being different in length, and reference numeral 15c a reflector affixed to the side of the light guide 15b where light exits and formed so as to surround the periphery of the fluorescent lamp 15a, the fluorescent lamp 15a, light guide 15b and reflector 15c constituting a surface luminous lighting unit 15A (hereinafter, referred to as a lighting unit). Since the diameter of the fluorescent lamp 15a is as small as a half that of a conventional one, the lighting unit can be made extremely narrow so as to be 20 mm to 30 mm.

Reference "a" denotes a side of the light guide 15b from which light enters, and reference "b" denotes a side of the same from which light exits (hereinafter, referred to as a light exiting side) and where the light guiding plates are laminated on each other in a step-like fashion (hereinafter, referred to as a light exiting end), and S1, S2, S3, S4, and S5 are reflecting surfaces of the reflector 15c for reflecting light projected from the sides of the respective light guiding plates P uniformly in a predetermined direction. As shown in FIG. 10, the lighting unit 15A is provided at any desired position on the rear side U of a shelf 14 in such manner that the fluorescent lamp 15a is located transversely inwardly of the shelf 14 and that the reflector 15c is affixed to the shelf 14 on one side thereof.

The operation of Embodiment 2 based on the construction described above will be explained.

in FIG. 10, when the fluorescent lamp 15a is turned on, all light from the fluorescent lamp 15a is projected in a concentrated manner to the light entering side a of the light guide 15b by means of the reflector 15c. The light is transmitted through the respective tight guiding plates P toward the light exiting side "b" by way of multiple total reflections according to a principle similar to that of optical fiber, and is uniformly projected to the reflector 15c from the sides of the light guiding plates P on the light exiting side. The light is then reflected in a surface luminous state from the reflecting surfaces S1 to S5 so as to be directed uniformly in a predetermined direction, so that a desired portion of the work surface 10S of a desk main body 12 can be illuminated uniformly with a sharp and directed light. This allows a user not only to study under a bright and uniform light and also prevents glare since the eyes of a user are not exposed to any direct lights from the fluorescent lamp 15a entering.

In addition, since the lighting unit 15A can be formed to very narrow it can be affixed to the rear side U of the shelf 14 as shown in FIG. 10, and thus kept invisible, thereby providing a well lit space with the lamp itself being hidden from view.

Furthermore, the fluorescent lamp within the surface luminous lighting unit cannot be seen by the user, the lighting unit has a neat appearance.

Moreover, if the lighting unit 15A is provided so as to be embedded in the rear side U of the shelf 14, the shelves 14 and the lighting unit 15A are integrated with each other to a further extent, and the whole of the lighting unit 15A can be made narrower, thus maintaining the pleasing appearance of the lighting unit 15A.

Furthermore, if the lighting unit 15A is made movable over the shelf 14, the irradiating position can be freely adjusted, thereby making it possible to obtain optimum illumination under different circumstances.

The light exiting side "b" of the light guide 15b of the lighting unit 15A is not necessarily constructed in a step-like fashion, and may be constructed so as to form a continuous inclined surface by inclining the sides of the respective light guiding plates P.

Embodiment 3

Figure 11:
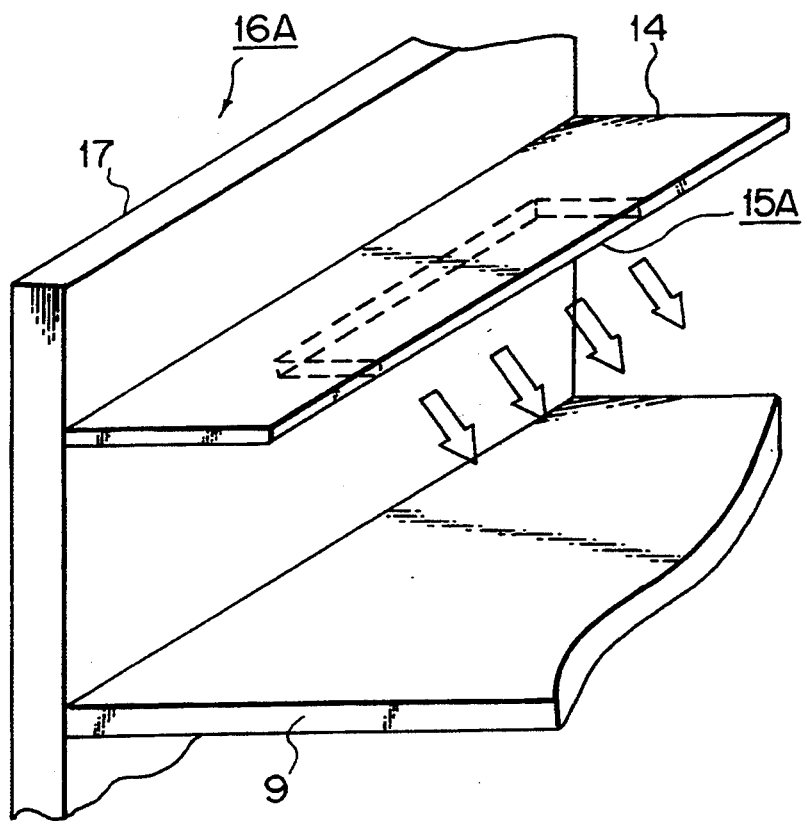
FIG. 11 is a perspective view, partially cut away, showing a partition, as Embodiment 3 of the present invention, in which the surface luminous illumination is provided.
Figure 12:
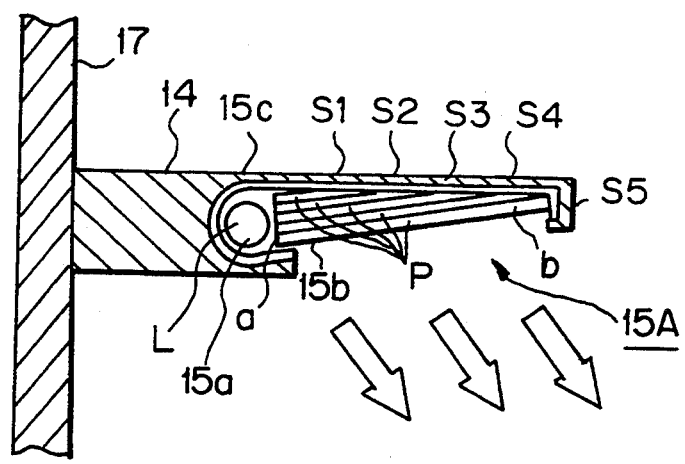
FIG. 12 shows the construction the main part of Embodiment 3.

FIG. 11 is a perspective view showing one example of a partition equipped with the surface luminous illumination, and FIG. 12 is a side cross-sectional view of the main part the above example.

In FIGS. 11 and 12, reference numeral 16A are a partition equipped with the surface luminous illumination, reference numeral 14 shelves that are detachably provided on the main body 17 of the partition, reference numeral 19 a working table plate that is detachably mounted with a predetermined space provided below the shelf 14 on the main partition body 17, reference numeral 15A a surface luminous lighting unit constructed exactly in the same way as the lighting unit of Embodiment 2 which comprises a high luminance narrow tube fluorescent lamp, as one example of a linear light source L (hereinafter, referred to as a fluorescent lamp) 15a the diameter of which is, for instance, a half that of a conventional fluorescent lamp, a light guide 15b (hereinafter, referred to as a light guide) comprising in turn rive light guiding plates P that are laminated on each other so as to correspond to the diameter of the fluorescent lamp 15a in such a manner that the five light guiding plates P are made level with each other on the light entering sides thereof, while being arranged in a step-like fashion on the light exiting sides thereof, the light guiding plates being made from a material having good light transmission such as a methyl methacrylate polymer and being different in length, and a reflector 15c affixed to the light exiting side of the light guide 15b and formed so as to surround the periphery of the fluorescent lamp 15a. In this lighting unit 15A, since the diameter of the fluorescent lamp 15 used is as small as a half the diameter of a conventional one, the lighting unit can be made very narrow to be 20 mm to 30 mm thick. In this construction, the lighting unit is embedded in the shelf 14 in such a manner that it becomes level with the front edge of the rear side of the shelf 14, such that the fluorescent lamp 15a is located transversely inwardly of the shelf, and that the surface of the light guiding plate P on the side opposite to the reflector 15c is made open.

The operation of Embodiment 3 will be described below based on the above construction.

In FIG. 12, when the fluorescent lamp 15a is turned on, light from the fluorescent lamp 15a is concentratedly projected to the light entering side of the light guide 15b by means of the reflector 15c. The light is transmitted through the respective light guiding plates P toward the light exiting side b while providing total reflections according to a similar principle to that of optical fibers, and is projected uniformly to the reflector 15c from the sides of the respective light guiding plates P on the light exiting side b. The light so projected is then reflected uniformly in a surface luminous state from the reflecting surfaces S1 to S5 of the reflector 15c so as to be directed in a predetermined direction, whereby a desired portion on the work surface S of the working table 19 is uniformly and effectively illuminated under sharp and directed light distribution. This allows a user to study or work under bright and uniform illumination, and moreover since direct light from the fluorescent lamp 15a is totally prevented from light entering the eyes of the user, no exhaustion due to glares can be felt.

In addition, the lighting unit 15A can be formed to be extremely thin, and therefore it can be affixed to the rear side U of the shelf 14, as shown in FIG. 12. Due to this, the lighting unit 15A is prevented from entering the visual field of the user, which allows the user to study in a calm atmosphere in which there is no lamp visible.

Furthermore, in Embodiment 3, since the lighting unit 15A is provided on the rear side U of the shelf 14 in such a manner as to be embedded therein, the shelf 14 and the lighting unit 15A are further integrated with each other, thereby making the overall lighting unit narrower thus providing a good appearance. However, if desired, the lighting unit 15A may be provided at a desired position on the shelves 14 in such a manner as to be affixed thereto as in the case of Embodiment 2, instead of being embedded in the shelf 14.

Moreover, if the lighting unit 15A is movably affixed to the shelf 14 the irradiating position can be adjusted so as to meet the eyes of the user, thereby making it possible to obtain good-conditioned illumination for certain purposes at all times.

In Embodiment 3, although the description of a working table is made with reference to the working table plate that is detachably mounted on the partition main body 17, a separate table or a desk may be brought to the partition main body 17 so as to be affixed thereto.

Embodiment 4

Referring to the drawings, Embodiment 4 of the present invention will be described below in which the invention is applied to a kitchen sink cabinet.

Figure 14:
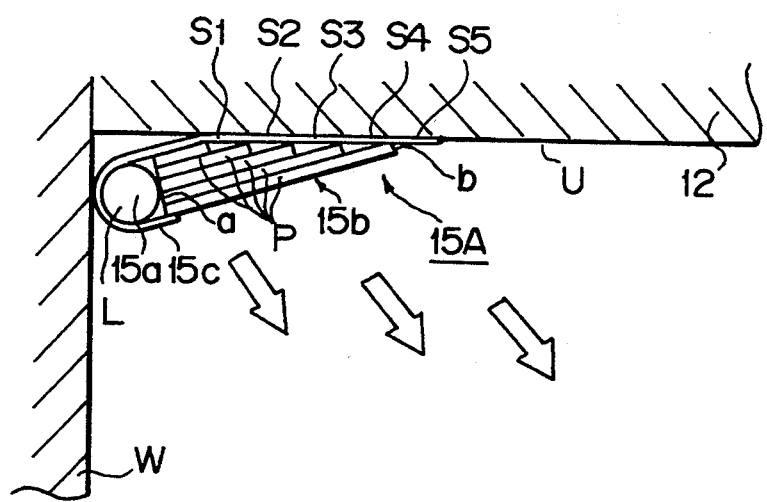
FIG. 14 shows the construction of the main part of Embodiment 4.
Figure 13:
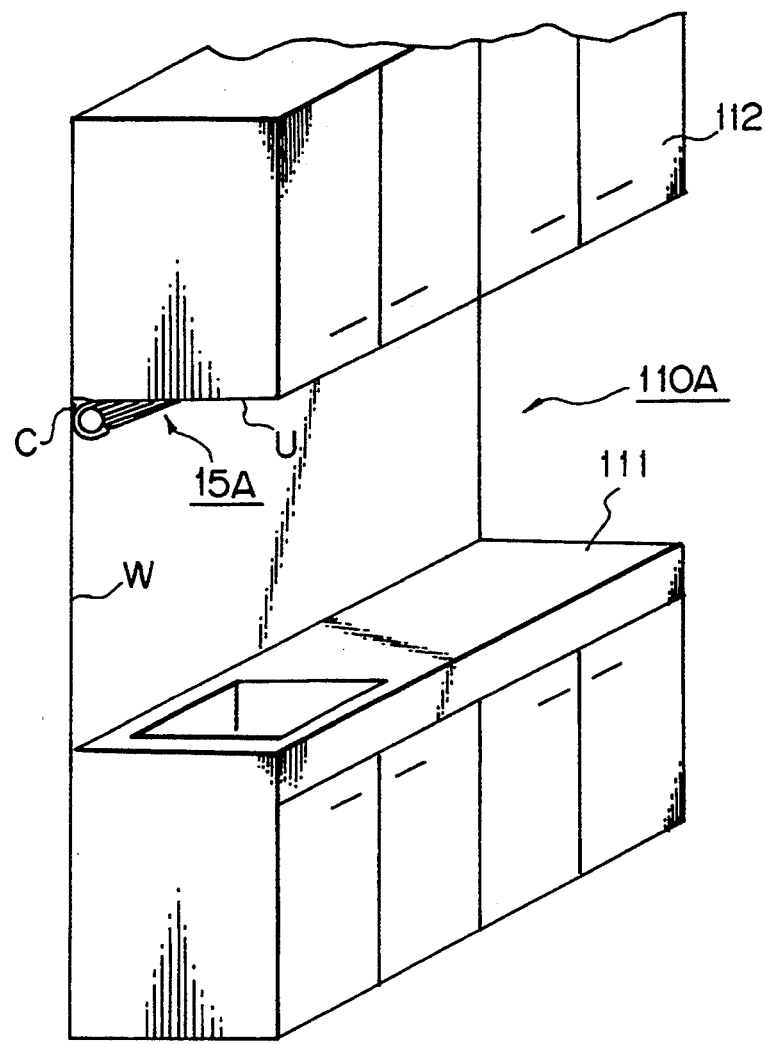
FIG. 13 is a perspective view, partially cut away, showing the construction of a kitchen sink cabinet, as Embodiment 4 of the present invention, in which the surface luminous illumination is provided.

FIG. 13 is a perspective view showing the construction of the sink cabinet unit 110A equipped with the surface luminous illumination according to one embodiment of the present invention, and FIG. 14 is an explanatory view showing the construction of the main part of the sink cabinet of the above embodiment.

In FIGS. 13 and 14, reference numeral 110A denotes a sink cabinet unit equipped with the surface luminous illumination, reference numeral 15A a surface luminous lighting unit (hereinafter, referred to as a lighting unit) constructed totally in the same manner as the lighting unit of Embodiment 2 which comprises a high luminance narrow tube fluorescent lamp (hereinafter, referred to as a fluorescent lamp) 15a having a remarkably small diameter compared with that of a conventional fluorescent lamp as one example of a linear light source, such as a diameter half that of the conventional fluorescent lamp, a laminated light guide (hereinafter, referred to as a light guide) 15b comprising in turn five light guiding plates P that are laminated on each other so as to meet the diameter of the fluorescent lamp 15a in such a manner that the lighting guide plates P are made level with each other on one side thereof, while they are arranged in a step-like fashion on the other side thereof, the light guiding plates being made from a material providing good transmission of light such as a methyl methacrylate polymer and being different in length, and a reflector 15c formed so as to surround the periphery of the fluorescent lamp 15a except for the portion thereof facing the light guide 15b. Reference "a" denotes one side of the light guide 15b which is formed level (hereinafter, referred to as a light entering side), and reference "b" denotes the other side of the light guide 15b which is inclined so as to form a step-like configuration (hereinafter, referred to as a light exiting side). The linear light source 15a is affixed to the light entering side "a", and the reflector 15c is affixed to the light exiting side "b" in such a manner as to extend thereover.

Since the diameter of the fluorescent lamp 15a used is made as small as half that of the conventional one, the lighting unit can be formed extremely narrow so as to be 20 mm to 30 mm in thickness, whereby it is disposed at a corner C formed between the bottom U of a shelf of a storage cabinet and the surface W of a wall with the fluorescent lamp 15a being in abutment with the corner C so formed and the reflector 15c being affixed to the bottom U of the storage shelf at the back thereof. S1, S2, S3, S4 and S5 are reflecting surfaces of the reflector for reflecting uniformly light projected from the sides of the respective laminated light guiding plates P in a predetermined direction.

The operation of Embodiment 4 will be described below based on the construction thereof, which is explained above.

In FIG. 14, when the fluorescent lamp 15a is turned on, all light from the fluorescent lamp 15a is projected concentratedly to the light entering side "a" of the light guide 15b. This light is transmitted through the respective light guiding plates P toward the light exiting side "b" by way of multiple total reflections according to a principal similar to that of optical fiber, and is projected uniformly onto the reflector 15c from the sides of the respective light guiding plates P on the light exiting side "b". The light projected is then reflected uniformly from the reflecting surfaces S1 to S5 of the reflector 15c in a surface luminous state so as to be directed in a predetermined direction, so that a desired surface of the sink cabinet main body 112 is uniformly illuminated with sharp light distribution which is less subject to attenuation of light. Moreover, since there is no direct light from the fluorescent lamp 15a light entering the eyes of the user, no exhaustion due to glares is felt.

In addition, since the surface luminous lighting unit is extremely thin, and since it is disposed at the corner C formed between the bottom U of the storage shelf and the wall surface W, the fluorescent lamp 15a is surrounded by the reflector 15c so that it is not directly visible. The lighting unit 15A looks extremely good, and therefore imparts a good appearance to the sink cabinet unit 110A as a whole.

The present invention is not limited to the above embodiment, and the lighting unit 15A may be affixed to the wall surface W.

Furthermore, the configuration of the side "b" of the laminated light guide 15b that is inclined in a step-like fashion is not limited to such a step-like configuration, and the sides of the light guiding plates P that are laminated in a step-like fashion may be inclined so that a continuous inclined surface is formed at the end "b".

Embodiment 5

Figure 15:
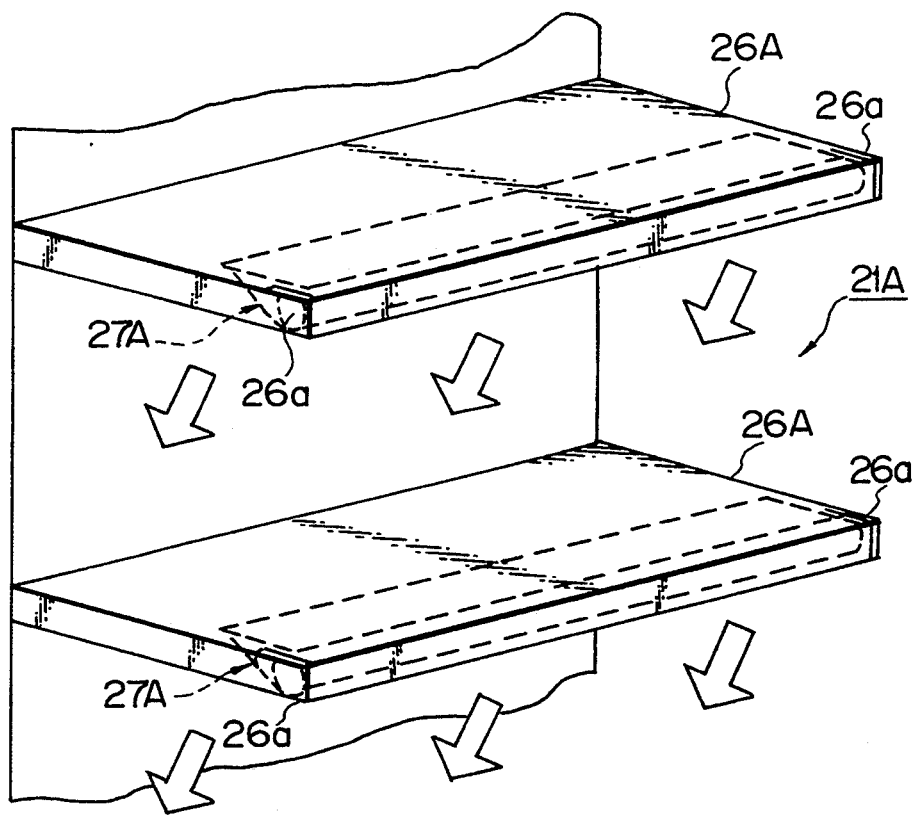
FIG. 15 is a perspective view explaining the construction of display shelves, as an Embodiment 5 of the present invention, in which the surface luminous illumination is provided.
Figure 16:
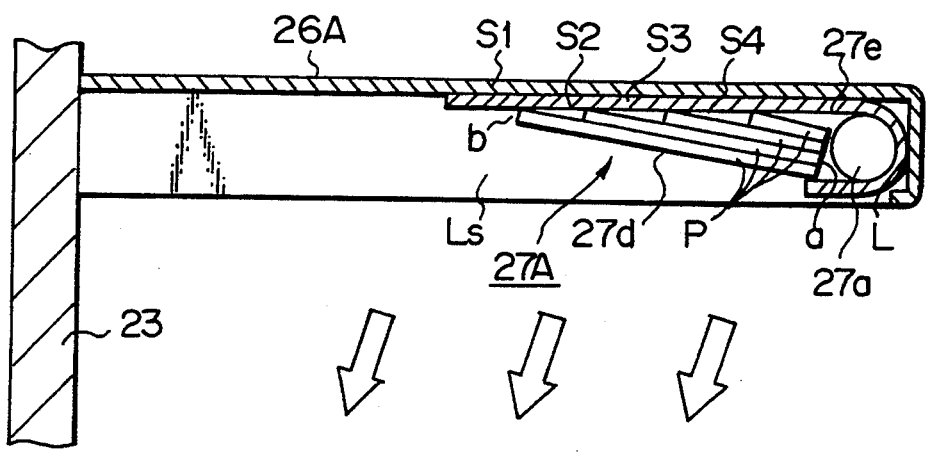
FIG. 16 is a cross-sectional view showing the construction of the main part of the display shelves of the above Embodiment 5 in which a lighting unit employing the surface luminous illumination is embedded.

FIG. 15 is a perspective view explaining the construction of display shelves equipped with the surface luminous illumination according to one embodiment of the present invention, and FIG. 16 is a side cross-sectional view showing the construction of the main part of the shelves main body of the above display shelves in which the surface luminous lighting unit is embedded.

in FIGS. 15 and 16, reference numeral 21A denotes display shelves equipped with the surface luminous illumination (hereinafter, referred to as display shelves), reference numeral 26A shelves main body of the display shelves 21A, reference numeral 27a a high-luminance narrow tube fluorescent lamp, as one example of a linear light source L, having a diameter much smaller than that of a conventional fluorescent lamp (hereinafter, referred to as a fluorescent lamp), reference numeral 27d, a laminated light guide comprising four light guiding plates P that are laminated so as to meet the diameter of the fluorescent lamp 27a in such a manner that they become level with each other on one side thereof, while being arranged in a step-like fashion so as to form an inclined surface on the other side (hereinafter, referred to as a light guide), the light guiding plates being formed from a material having good light transmission such as a metyl methacrylate polymer and different in length, reference "a" one side of the light guide 27 that is made level. (hereinafter, referred to as a light entering side), reference "b" the other side of the same light guide that is inclined .in a step-like fashion (hereinafter, referred to as a light exiting side), and reference numeral 27e a reflector affixed to the light exiting side "b" in such a manner as to extend thereover and adapted to surround the fluorescent lamp 27a affixed to the light entering side. The surface luminous lighting unit 27A is constituted by the fluorescent lamp 27a, light guide 27d, and reflector 27e (hereinafter, referred to as a lighting unit).

Since the fluorescent lamp 27a used has a small diameter, such as a half that of a conventional fluorescent lamp, this lighting unit 27A can be formed as narrow as 20 mm to 30 mm. In this example, the narrow lighting unit 27A is embedded in the shelves 26A along the front side thereof with a light projecting surface Ls facing the bottom side of the shelf main body 26A.

Reference numeral 26a denotes a cover provided at the ends of the shelves 26A adjacent to the front side thereof in such a manner as to be opened or detached when the fluorescent lamp 27a needs to be replaced or in a case where repair of the lighting unit 27A is required. S1, S2, S3, and S4 are reflecting surfaces of the respective reflecting plates 27cfor reflecting uniformly in a predetermined direction light projected from the respective layered light guiding plates 29.

The operation of Example 4 will now be described based on the construction explained above.

In FIG. 16, when the lighting lamp 27a is first turned on, light from the fluorescent lamp 27a is projected by means of the reflecting plates 27e concentratedly to the light entering side a of the light guide 27d. This light is then transmitted through the respective light guiding plates P toward the light exiting side b while repeating total reflections in accordance with a principle similar to that of optic fiber, is projected uniformly to the reflecting surfaces S1 to S4 of the reflecting plates 27e from the side edges of the respective light guiding plates P on the light exiting side b, and is reflected thereon so as to effect surface luminous illumination with well-directed bat-wing light distribution, whereby the top surface of the shelves is uniformly illuminated with light from the light projecting surface facing the bottom side of the shelves 26A. The area of the light projecting surface and light projecting angle can optionally be set by the inclination of the light exiting side b.

Next, another application off the present invention to the display shelves will be described with reference to FIGS. 17 and 18.

Figure 17:
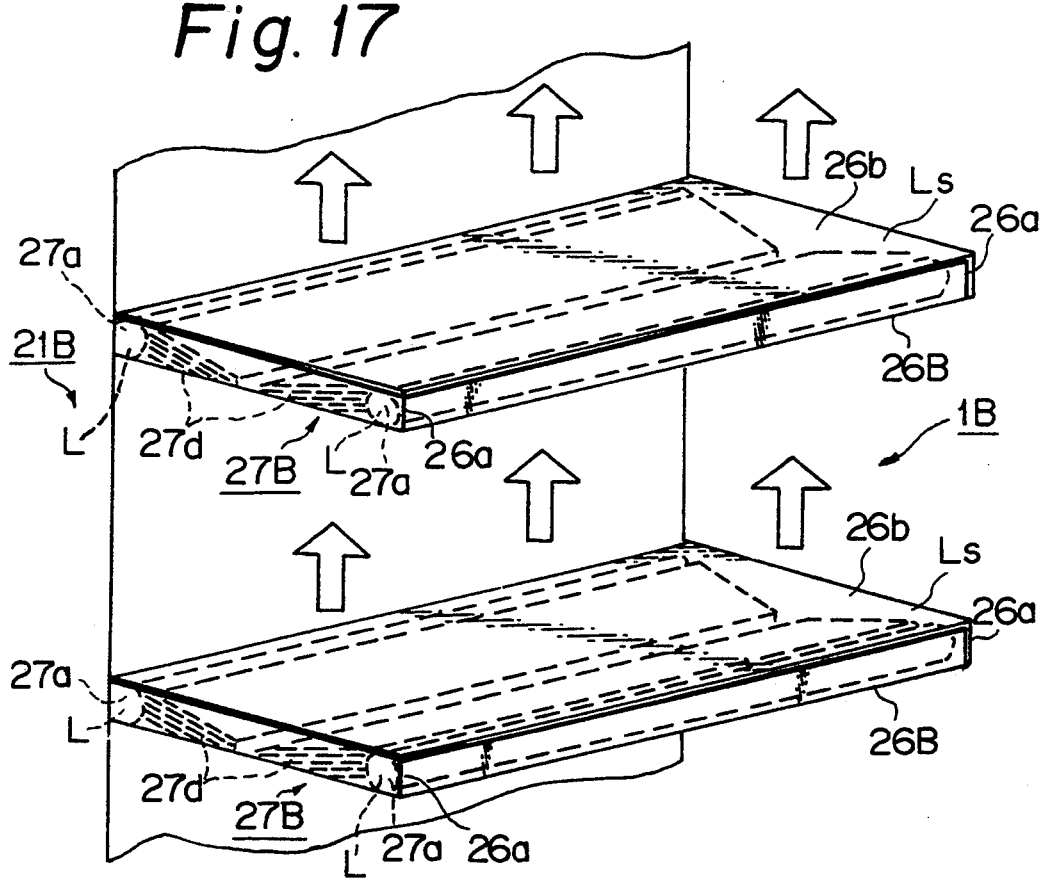
FIG. 17 is a perspective view explaining the construction of display shelves equipped with surface illumination according to the Embodiment 5 of the present invention.
Figure 18:
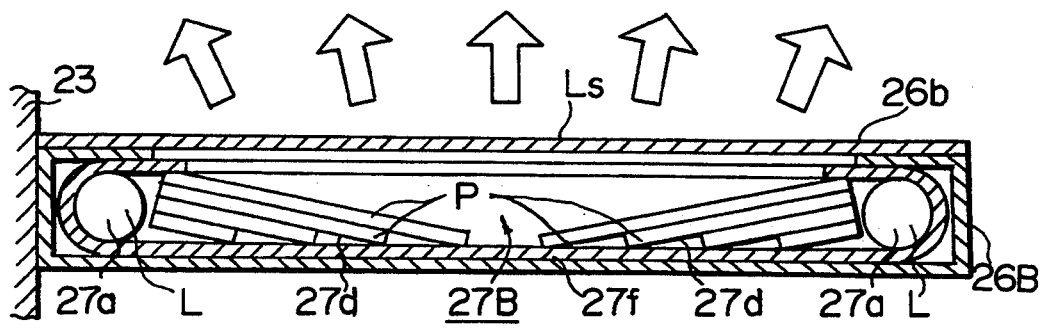
FIG. 18 is a cross-sectional view showing the construction of the main part of the display shelves of the above Embodiment 5 in which the surface luminous lighting unit is embedded.

FIG. 17 is a perspective view explaining the construction of display shelves equipped with the surface luminous illumination according to another application of the present invention, and FIG. 18 is a side cross-sectional view showing the main part of the shelves main body in which the surface luminous lighting unit is embedded.

In FIG. 17, reference numeral 26B denotes the shelves main body, 27B the surface luminous lighting unit constituted by two fluorescent lamps 27a as linear fight sources L that are disposed opposite to each other, two light guides 27d, and a reflector 27f affixed to the fluorescent lamps 27a and light guides 27d for common use. A light diffuser 26b, functioning as shelves as well, is provided on the upwardly directed light projecting surface Ls of the lighting unit 27B in such a manner as to cover the same. The operation will next be described based on the above construction.

When the fluorescent lamps 27a disposed along the front and rear sides of the shelves main body 26B are turned on, as in the case of the above example, light uniformly guided is reflected widely upwardly in a well-directed fashion by means of the reflector 27f. This uniformly reflected light is then diffused uniformly by the light diffuser 26b, and light is irradiated upwardly from the top surface of the shelves main body 26B in such a manner that the whole of the top surface of the shelves main body 26B becomes luminous, whereby what is displayed is uniformly illuminated from below.

Thus, with the present invention, what is displayed is uniformly illuminated, and moreover illumination of various types can be achieved, such as close-up illumination, and illumination that is aesthetically constructed so to give desired shadows. On top of that, since the lighting unit is totally embedded in the shelves main body, it is possible to effect illumination in which no glares can be felt.

Furthermore, since the lighting unit according to the present invention can be formed extremely thin, there is no risk of the unit protruding from the shelves main body, thereby making it possible to effectively utilize display space.

The present invention is not limited to the above example, a construction may be used in which a light diffuser is also used on the bottom surface of the shelves main body so as to effect total surface illumination. Alternately, in a case where display shelves are provided with side walls, the lighting unit may be installed in either of the side walls, or in both side walls so as to carry out sideward illumination effectively.

Moreover, the configuration of the side of the laminated light guide on which it is inclined in a step-like fashion is not limited to such a configuration, but the relevant side of the laminated light guide may be constructed so that the stepped side forms a continuous slope.

Embodiment 6

Figure 19:
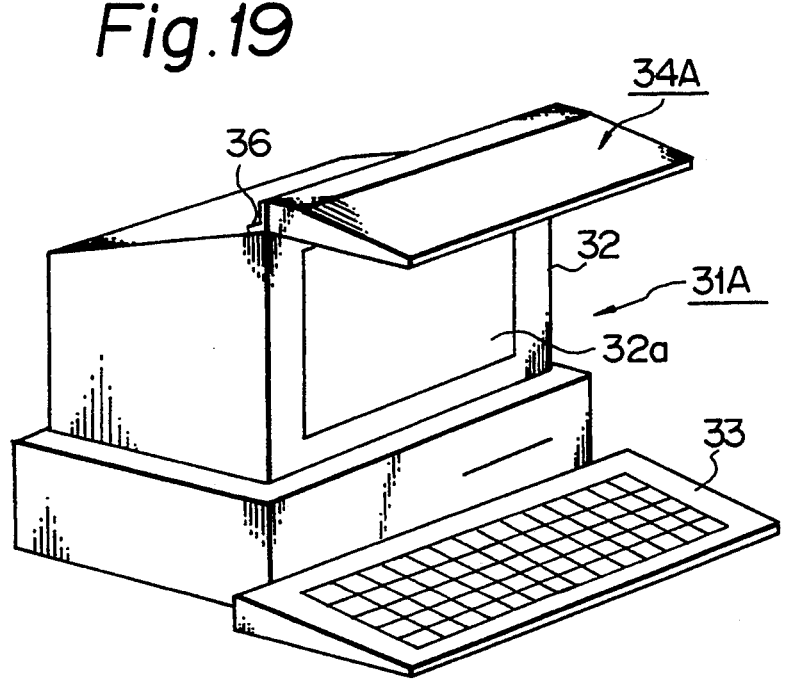
FIG. 19 is a perspective view showing the construction of a further example of the present, invention in which the surface luminous illumination is provided on a display unit with a keyboard.
Figure 20:
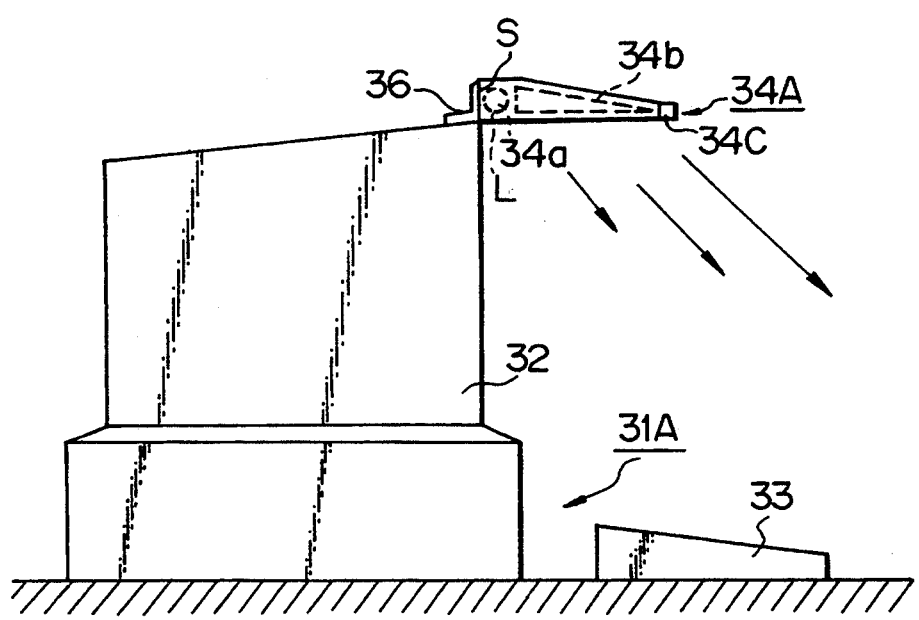
FIG. 20 is a side view showing the construction of the display unit with the surface luminous illumination and the keyboard according to the above Embodiment 6.
Figure 21:
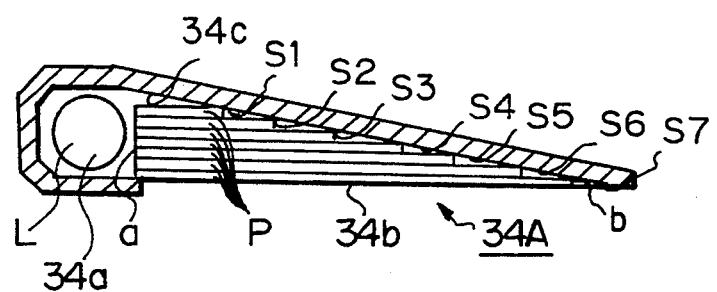
FIG. 21 is a side cross-sectional view showing the construction of a lighting unit with the surface luminous illumination according to the above example.

FIG. 19 is a perspective view showing the construction of a display unit equipped with the surface luminous illumination and a keyboard according to one example of the present invention, FIG. 20 is a side view showing the construction of the above example, and FIG. 21 is a side cross-sectional view showing the construction of the example.

In FIGS. 19 and 20, reference numeral 31A denotes a display unit equipped with the surface luminous illumination, reference numeral 34A a surface luminous lighting unit (hereinafter, referred to as a lighting unit), reference numeral 34a a high-luminance narrow tube fluorescent lamp having a very small diameter in comparison to that of a conventional fluorescent lamp as one example of a linear light source L (hereinafter, referred to as a fluorescent lamp), reference numeral 34b a light guide comprising seven light guiding plates P that are laminated so as to meet the diameter of the fluorescent lamp 34a in such a manner that those plates P are made level with each other on one side thereof where light enters, while they are inclined in a step-like fashion on the other side, the light guiding plates being formed of a material providing good transmission of light such as a methyl methacrylate polymer, and being different in length (hereinafter, referred to as a light guide), reference a the side of the light guide 34b where it is made level (hereinafter, referred to as a light entering side), and reference b denotes the other side of the light guide 34b where it is inclined in a step-like fashion (hereinafter, referred to as a light exiting side). The linear light source 34a is affixed to the light entering side a, and a reflector 34c is affixed to the light exiting side in such a manner as to extend thereover. This reflector 34c is constructed in such a manner as to surround the periphery of the fluorescent lamp 34a except the surface thereof facing the light guide 34b so that light from the fluorescent lamp 34a is projected concentratedly to the level side a.

Since the diameter of the fluorescent lamp 34a is as small as a half that of a conventional fluorescent lamp, the lighting unit 34A constituted by the fluorescent lamp 34a, the light guide 34b, and the reflector 34c can be formed as narrow as 20 mm to 30 mm.

S1, S2, S3, S4, S5, S6, and S7 are reflecting surfaces of the reflector 34c for reflecting uniformly in a predetermined direction light projected from the side of the respective laminated light guiding plates P. Reference numeral 36 denotes an L-shaped holding member mounted on the top edge of a display unit main body, and the surface luminous lighting unit 34A is affixed to the holding member 36 which is disposed at the top front edge of the display unit main body 32 in such a manner that it is affixed to the vertical surface of the holding member 36 on the side of the fluorescent lamp 34a with the surface luminous side thereof being directed downwardly so as to face the keyboard 33.

The operation will now be described based on the construction explained above. When an operator first turns on the lighting unit 34A before he/she starts to input data with the keyboard 33, the fluorescent lamp 34a is turned on. All light from the fluorescent lamp 34a is projected concentratedly to the level side a of the light guide 34b by means of the reflector 34c. This light so projected is then guided through the respective light guiding plates P toward the light exiting side b without diffusion loss in accordance with a principle similar to that of optical fibers, and is projected uniformly to the reflector 34c from the sides of the light guiding plates P on the light exiting side "b". The light is then reflected in a surface luminous state by means of the reflecting surfaces S1 to S7 so as to be directed to the keyboard 33, whereby the keyboard 33 is effectively illuminated with a sharp and bright light distribution with low light attenuation. In this case, since the distribution of light is totally directed to the surface of the keyboard 33 with no reflection of light on a display screen, what is displayed on the display screen is made clear, thereby making it easy for the operator to read the contents.

In addition, since there is no direct light from the fluorescent lamp 34a comes into direct contact with the eyes of the operator, exhaustion due to glare can be prevented.

Furthermore, since the back of the reflector 34c of the lighting unit 34A also functions as a glare protection plate, light from the illumination inside a room can be prevented from entering the display screen 32a, whereby the what is displayed is made extremely clear, thereby making it possible to advantageously improve the operating efficiency.

Figure 22:
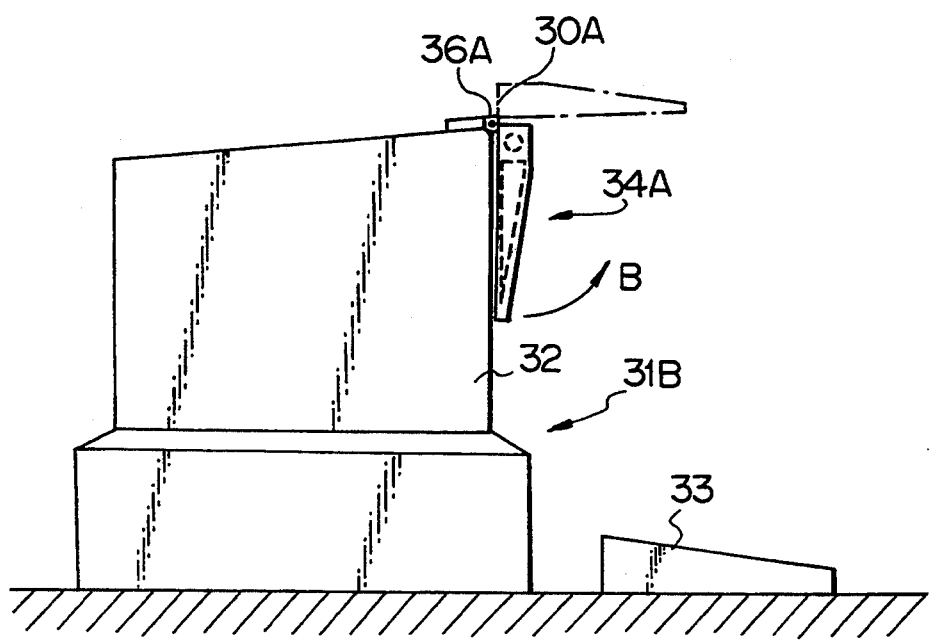
FIG. 22 is a side view showing the construction of a still further example of the present invention in which the surface luminous illumination is provided on a display unit with a keyboard.

Next, a further embodiment of the Embodiment 6 is shown in FIG. 22, in which like reference numerals are used show like or corresponding components used in the above embodiment.

In FIG. 22, reference numeral 31B denotes a display unit with the surface luminous lighting unit (hereinafter, referred to as a lighting unit), reference numeral 36A a hinge-type holding member, as one example of a rotating means 30A, which is rotatable so as to hold the lighting unit 36A any angle.

In the above construction, when the operator inputs data with the keyboard 33, he/she rotates the lighting unit 34A that is held in a suspended fashion by means of the holding member 36A in such a manner as to cover the display screen 32a of the display unit main body upwardly, i.e., in the direction indicated by 30B in the figure so as to hold the same at any angle as shown by a chain line. The detailed description of the operation of this embodiment is the same as that of the above one, and therefore is omitted.

In this embodiment, when there is no operation of the keyboard 33, the lighting unit 34A is rotated so as to be suspended in front of the display screen 32a to be held thereat, in which case the reflector 34c of the lighting unit 34A functions as a protective cover for the display screen 32a. Moreover, this allows the lighting unit 34A to be folded compactly, thereby improving a working atmosphere.

The irregularly arranged side configuration of the laminated light guide of the surface luminous lighting unit is not limited to such a step-like fashion, but another configuration may be employed in which the sides of the respective light guiding plates are slanted so as to form a continuous inclined surface on the light exiting side.

As is described heretofore in relation to Embodiment 1, according to the first lighting unit of the present invention, since the length of the longer side of the light panel is made shorter than the distance B between the filaments of the lamp, and made longer than the distance between the portions giving a luminance of 75% of the maximum luminance of the lamp, it is possible to reduce the weight of the light panel and to effectively transmit light from the lamp into the light panel.

Moreover, according to the second lighting unit of the present invention, since lamp operating devices are provided in the spaces formed at the ends of the above light panel, it-is possible to make the lighting unit narrow and compact.

As is described heretofore in relation to Embodiment 2, according to the study desk equipped with the surface luminous illumination of the present invention, since the surface luminous lighting unit is affixed to an optional position on the rear side of the shelf of the bookstack placed on the study desk, it is possible to illuminate the top of the desk uniformly and efficiently in a directed surface luminous state. This allows a user to study under bright and uniform illumination, and moreover since there is no direct light from the linear light source entering the eyes of the user, no exhaustion due to glares can be felt.

As is described heretofore in relation to Embodiment 3, according to the partition equipped with the surface luminous illumination of time present invention, since the surface luminous lighting unit is affixed to an optional position on the rear side of the shelf that is in turn affixed to the partition, it is possible to illuminate the work surface uniformly and efficiently in a directed surface luminous state. This allows the user to work under bright and uniform illumination, and moreover since there is no direct light from the linear light source entering the eyes of the user, no exhaustion due to glares can be felt.

As is described heretofore in relation to Embodiment 4, according to the kitchen sink cabinet unit equipped with the surface luminous illumination of the present invention, since the surface luminous lighting unit is provided at the corner formed between the bottom surface of the storage cabinet of the sink cabinet unit and the surface of a wall so as to effect the illumination of the sink, it is possible to uniformly illuminate a desired portion of the sink that is actually used under sharp and directed light distribution with less light attenuation. Moreover, since there is no direct light from the linear light source, no exhaustion due to glares can be felt.

As is described heretofore In relation to Embodiment 5, according to the present invention, since the surface luminous lighting unit is embedded in the shelves main body of the display cabinet with the light projecting surface of the lighting unit being set either in the top surface or bottom surface of the shelves main body, it is possible to effect illumination with directed, sharp, and uniform light distribution in which no glare occurs. Moreover, if a light diffuser may be used so as to illuminate the whole of the shelf and display space.

Moreover, since the surface luminous lighting unit of the present invention can be formed to be extremely thin, it is possible to embed it in the shelves main body so as not to be seen from the outside. This allows the surface luminous lighting unit to be integrated with the shelves main body, and also obviates the necessity of provision of space for the lighting unit on the shelves surface, thereby making it possible to utilize the display space of the display shelves to a maximum extent. In addition, the effect is aesthetically pleasing.

As is described theretofore in relation to Embodiment 6, according to the present invention, since the surface luminous lighting unit is provided on the display unit in such a manner that the lighting unit is held on the upper portion of the display unit main body with the light projecting surface thereof being caused to face downwardly, and that the lighting unit is folded by means of the rotating means while the keyboard is not in use so as to protect the display screen of the display unit main body with the lighting unit, when data is input with the keyboard, it is possible to illuminate the keyboard uniformly and effectively under a bright directed light with low light attenuation by means of the surface luminous lighting unit constituted by the linear light source, light guide, and reflector. Moreover, since no glare occurs, and since there is no light reflected on the display screen of the display unit main body, what is displayed is made clear. In addition to this, the surface of the luminous lighting unit itself functions as a glare protector against light from room illumination. This also serves to make what is displayed extremely clear, thereby allowing the user to perform an input operation accurately and efficiently.

Furthermore, when the keyboard is not in use while no inputting operation is being carried out, the surface luminous lighting unit can be rotated so as to be held in a suspended fashion in front of the display screen, thereby making it possible to protect the display screen of the display unit main body. On top of tills, the lighting unit can be folded compactly.

In any embodiments of the present invention, since the surface luminous lighting unit can be formed to be extremely thin, it is possible to install it in a very compact fashion.

What is claimed is:

1. A surface luminous lighting device comprising:
   a light panel comprising a plurality of laminated light guiding plates of different lengths;
   a linear light source disposed in parallel to said light panel; and
   a reflector for reflecting light transmitted through said light panel from said linear light source,
   wherein a longer side of said light panel is made shorter than a first distance between filaments of said linear light source but longer than a second distance between portions where a luminance of said linear light source is equal to 75% of a maximum luminance of said linear light source.

2. A surface luminous lighting device comprising:
   a light panel comprising a plurality of laminated light guiding plates of different lengths;
   a linear light source disposed in parallel to said light panel;
   a reflector for reflecting light transmitted through said light panel from said linear light source; and
   starting means, disposed adjacent to ends of said light panel, for starting said linear light source,
   wherein a longer side of said light panel is made shorter than a first distance between filaments of said linear light source but longer than a second distance between portions where a luminance of said linear light source is equal to 75% of a maximum luminance of said linear light source.

3. A surface luminous lighting unit comprising:
   a light panel comprising a plurality of laminated light guiding plates of different lengths;
   a linear light source disposed in parallel to said light panel;
   a reflector for reflecting light transmitted through said light panel from said linear light source; and
   mounting means for mounting said surface luminous lighting unit on an object to be illuminated so as to distribute light concentratedly to a desired portion of said object to be illuminated.
   wherein a longer side of said light panel is made shorter than a first distance between filaments of said linear light source but longer than a second distance between portions where a luminance of said linear light source is equal to 75% of a maximum luminance of said linear light source.

4. The surface luminous lighting unit of claim 3 wherein said mounting means provides detachable mounting on said object.

5. A self-illuminating study desk comprising:
   a light panel comprising:
      a plurality of laminated light guiding plates of different lengths;
      a linear light source disposed in parallel to said light panel; and
      a reflector for reflecting light transmitted through said light panel from said linear light source; and
   mounting means for mounting said light panel on an object to be illuminated so as to distribute light concentratedly to a desired portion of said object to be illuminated,
   wherein a longer side of said light panel is made shorter than a first distance between filaments of said linear light source but longer than a second distance between portions where a luminance of said linear light source is equal to 75% of a maximum luminance of said linear light source, and
   wherein said reflector has a reflecting side that faces the light exiting side of said light guide, and a back side that is opposite the reflecting side, and
   wherein said light panel is secured to said study desk in such a manner that said back side of said reflector is affixed to an under side of a shelf of a main body of said study desk at a predetermined location of said shelf that causes a concentrated light distribution to be produced at a desired portion on a top of said study desk main body when said surface luminous lighting unit is in operation.

6. A method for making a surface luminous lighting unit comprising a light panel including a plurality of laminated light guiding plates of different lengths; a linear light source disposed in parallel to said light panel; and a reflector for reflecting light transmitted through said light panel from said linear light source, the method comprising the step of:
   making a longer side of said light panel shorter than a first distance between filaments of said linear light source but longer than a second distance between portions where a luminance of said linear light source is equal to 75% of a maximum luminance of said linear light source.

* * * * *